United States Patent
Sridharan et al.

(10) Patent No.: US 7,697,901 B2
(45) Date of Patent: Apr. 13, 2010

(54) DIGITAL VARIABLE GAIN MIXER

(75) Inventors: Srinath Sridharan, Austin, TX (US);
Ahmed Emira, Cairo (EG); Aria Eshraghi, Austin, TX (US); David Welland, Ouistreham (FR)

(73) Assignee: ST-Ericsson SA, Geneva (CH)

( * ) Notice: Subject to any disclaimer, the term of this patent is extended or adjusted under 35 U.S.C. 154(b) by 978 days.

(21) Appl. No.: 11/394,249

(22) Filed: Mar. 30, 2006

(65) Prior Publication Data

US 2007/0072558 A1    Mar. 29, 2007

Related U.S. Application Data (60) Provisional application No. 60/720,413, filed on Sep. 26, 2005.

(51) Int. Cl.
*H01Q 11/12* (2006.01)
*H04B 1/04* (2006.01)

(52) U.S. Cl. .................. 455/86; 455/127.2; 455/73; 455/234.2; 455/245.1; 455/313; 375/297

(58) Field of Classification Search .............. 455/73, 455/86, 127.2, 127.3, 127.4, 123, 124, 232.1, 455/234.1, 234.2, 245.1, 293, 313; 375/297
See application file for complete search history.

(56) References Cited

U.S. PATENT DOCUMENTS

| | | | | |
|---|---|---|---|---|
| 4,700,327 A | * | 10/1987 | Hilton | ............................ 369/6 |
| 6,369,666 B1 | | 4/2002 | Simon et al. | |
| 6,563,383 B1 | * | 5/2003 | Otaka et al. | .................. 330/254 |
| 6,711,391 B1 | * | 3/2004 | Walker et al. | ............ 455/234.1 |
| 6,747,987 B1 | | 6/2004 | Meador | |
| 6,812,771 B1 | * | 11/2004 | Behel et al. | .................. 327/359 |
| 7,065,327 B1 | * | 6/2006 | Macnally et al. | ............... 455/78 |
| 7,394,862 B2 | | 7/2008 | Jensen et al. | |
| 7,421,259 B2 | * | 9/2008 | Gomez et al. | ................ 455/130 |
| 7,444,124 B1 | * | 10/2008 | Loeb et al. | ............... 455/127.3 |
| 7,542,741 B2 | * | 6/2009 | Rozenblit et al. | ......... 455/127.2 |
| 2002/0039047 A1 | * | 4/2002 | Suzuki | ........................ 330/133 |

(Continued)

FOREIGN PATENT DOCUMENTS

CN    101273533 A    11/2008

(Continued)

OTHER PUBLICATIONS

Silicon Laboratories, "Si4212: Aero IIe Transceiver for GSM, GPRS, and EDGE," Sep. 16, 2005, p. 1-2.

(Continued)

*Primary Examiner*—Matthew D Anderson
*Assistant Examiner*—Erica Fleming-Hall
(74) *Attorney, Agent, or Firm*—Scott J. Hawranek; William J. Kubida; Hogan & Hartson LLP (57) ABSTRACT

A method includes controlling a mixer gain to provide a range of selected power output levels from the mixer using a first control scheme for a low portion of the range and using a second control scheme for a high portion of the range. Using the selected mixer gain, incoming baseband signals may be upconverted in the mixer to a transmission frequency and output from the mixer at the selected power output level.

24 Claims, 4 Drawing Sheets

U.S. PATENT DOCUMENTS

| | | | |
|---|---|---|---|
| 2002/0135423 A1* | 9/2002 | Yamashita | 330/285 |
| 2004/0152437 A1* | 8/2004 | Behzad | 455/326 |
| 2004/0185810 A1* | 9/2004 | Kishi | 455/127.2 |
| 2005/0054308 A1* | 3/2005 | Vayrynen et al. | 455/127.4 |
| 2005/0059373 A1* | 3/2005 | Nakamura et al. | 455/255 |
| 2005/0107054 A1* | 5/2005 | Nakayama | 455/234.1 |
| 2005/0153671 A1* | 7/2005 | Ichikawa | 455/127.2 |
| 2005/0260956 A1* | 11/2005 | Loraine et al. | 455/127.3 |
| 2005/0270098 A1* | 12/2005 | Zhang et al. | 330/253 |
| 2006/0058074 A1* | 3/2006 | Tsividis | 455/574 |
| 2006/0072684 A1 | 4/2006 | Feher | |
| 2006/0160506 A1* | 7/2006 | Smentek et al. | 455/127.3 |
| 2006/0214842 A1* | 9/2006 | Takenoshita et al. | 342/175 |
| 2006/0244530 A1* | 11/2006 | Kocaman et al. | 330/254 |
| 2007/0087710 A1* | 4/2007 | Chou et al. | 455/127.4 |
| 2007/0111685 A1* | 5/2007 | Paul et al. | 455/127.3 |

FOREIGN PATENT DOCUMENTS

| | | |
|---|---|---|
| DE | 10209516 A1 | 7/2003 |
| EP | 1102392 A2 | 5/2001 |
| EP | 1341300 A1 | 9/2003 |
| GB | 2389251 A | 12/2003 |
| WO | 03/036896 A2 | 5/2003 |
| WO | 03088511 A | 10/2003 |
| WO | 2004/021659 A | 3/2004 |
| WO | 2005/088922 A | 9/2005 |
| WO | 2007037963 A1 | 4/2007 |

OTHER PUBLICATIONS

Patrick Morgan, Ph.D., et al., "Highly Integrated Transceiver Enables High-Volume Production of GSM/EDGE Handsets," Jul. 2006, pp. 1-6.

U.S. Appl. No. 11/510,339, filed Aug. 25, 2006, entitled, "Edge Transceiver Architecture and Related Methods," by David Welland.

Silicon Laboratories, "Aero™ II GSM/GPRS Transceiver," Jun. 2004, pp. 1-2.

Silicon Laboratories, "Aero® IIe Transceiver," Sep. 2005, pp. 1-2.

Silicon Laboratories, "Aero IIe Transceiver for GSM, GPRS, and EDGE," Sep. 16, 2005, pp. 1-2.

Notification Concerning Transmittal of International Preliminary Report on Patentability, Application No. PCT/US2006/035289, mailed Mar. 26, 2008, pp. 8.

* cited by examiner

DIGITAL VARIABLE GAIN MIXER

This application claims priority to U.S. Provisional Patent Application No. 60/720,413 filed on Sep. 26, 2005 in the name of David Welland, Patrick Morgan, Srinath Sridharan, Sheng-Ming Shan, Ahmed Emira, Aria Eshraghi and Donald Kerth entitled "Edge Transceiver Architecture and Related Methods".

FIELD OF THE INVENTION

The present invention relates to transceivers, and more particularly to a digital variable gain mixer of a transceiver.

BACKGROUND

Transceivers are used in many communication systems including wireless devices, for example. A transceiver can be used for both transmit and receive operations in a device. Often, a transceiver is coupled between a baseband processor and an antenna and related circuitry of the system. In the receive direction, incoming radio frequency (RF) signals are received by the transceiver, which downconverts them to a lower frequency for processing by the baseband processor. In the transmit direction, incoming baseband data is provided to the transceiver, which processes the data and upconverts it to a higher frequency, e.g., a RF frequency. The upconverted RF signals are then passed to a power amplifier (PA) for amplification and transmission via an antenna.

Thus the transceiver acts as an interface between baseband, digital and RF domains. Among the various tasks performed by a transceiver are downconversion and upconversion, modulation and demodulation, and other related tasks. Oftentimes, a transceiver is controlled by a baseband processor to which it is coupled. In turn, the transceiver is coupled to a power amplifier, which generates appropriately conditioned RF signals for transmission via an antenna. In the transmit direction, the transceiver provides RF signals to the power amplifier, which amplifies the signals based on gain and ramp information for a given modulation type. Different wireless communication protocols implement different modulation schemes. For example, a Global System for Mobile communication (GSM) system can implement various modulation schemes, including a gaussian minimum shift keying (GMSK) modulation scheme for voice/data. Furthermore, extensions to GSM, such as Enhanced Data rates for GSM Evolution (EDGE) use other modulation schemes, such as an 8 phase shift keying (8-PSK) modulation scheme.

While many different power amplifiers exist, most PAs receive various control signals, e.g., from the baseband processor, along with the data signal, e.g., from the transceiver. These control signals include an enable signal and the like. Also, a PA receives a supply voltage and one or more bias voltages. Some PAs in certain wireless protocols implement a linear architecture. These PAs can operate in dual modes of operation, namely a saturated mode and a linear mode. GMSK schemes typically transmit in a saturated mode in which transmitted data is output from the PA with a constant amplitude as measured by power versus time during the useful part of the burst. In contrast, 8-PSK modulation implements a linear mode in which a time-varying amplitude is output from the PA as measured by power versus time during the useful part of the burst.

In the 3 GPP specification, a mixed mode of operation is set forth. This mixed mode of operation, otherwise known as a dual transfer mode, switches modulation schemes during inter-slot periods. Specifically, one implementation calls for transmission in alternating GMSK-8-PSK schemes in different slots. Control between the modulation schemes switches in the inter-slot period. Accordingly, the 3 GPP specification requires that a switching spectrum be met in which power transients at the output of the power amplifier are reduced or eliminated in the inter-slot period to provide for proper operation.

In the different modes of operation, leakage currents from a phase-lock loop (PLL) path within a transceiver can affect RF output signals from the transceiver to the power amplifier, particularly in a linear transmitter architecture. Thus in the 8-PSK mode, currents from the PLL or an associated local oscillator, which may be unmodulated carrier signals, should not leak through an upconversion mixer to the output of the transceiver. If this were to occur, offset noise would appear that could violate the output-offset suppression (OOS) requirement of the 3 GPP specification. A need thus exists to prevent such noise from coupling through a mixer.

SUMMARY OF THE INVENTION

In one aspect, the present invention is directed to a method including controlling a mixer gain to provide a range of selected power output levels from the mixer using a first control scheme for a low portion of the range and using a second control scheme for a high portion of the range. These different schemes may allow for efficient design and reduced power consumption. Using the selected mixer gain, incoming baseband signals may be upconverted in the mixer to a transmission frequency and output from the mixer at the selected power output level. While the control schemes may vary, in one embodiment the first control scheme can be implemented by controlling a current density of incoming baseband signals coupled to one or more mixer slices, and the second control scheme may be implemented by coupling incoming baseband signals to additional mixer slices at a fixed current density.

In another aspect, the present invention includes an apparatus having a current density controller to receive an incoming baseband signal and to adjust a current density level of the signal, a mixer coupled to the current density controller, and a decoder. The mixer may include multiple slices each capable of receiving the signal at the adjusted current density level, and the decoder may be used to control enabling of slices and adjusting of the current density level. The current density controller may be formed of a current mirror having a controllable gain to generate a tail current from the incoming signal, in one implementation. The mixer may be a commutating mixer, in certain embodiments. In some implementations, the mixer may be controlled to receive an unmodulated carrier signal from a local oscillator and to mix the unmodulated carrier signal with an incoming baseband signal in a first mode of operation, while the mixer may receive and buffer a modulated signal from the local oscillator and mix the modulated signal with a DC current in a second mode of operation.

Yet another aspect of the present invention is directed to a mixer that includes multiple slices. The slices may include a first slice having a first pair of buffers to receive local oscillator signals of different polarities, a first pair of switches to receive and pass tail currents of different polarities, and a first mixer circuit to mix the local oscillator signals with the tail currents. The slices may further include a second slice having a second pair of buffers to receive the local oscillator signals, a second pair of switches to receive and pass the tail currents, and a second mixer circuit to mix the local oscillator signals with the tail currents. The second slice may be a mirror image of the first slice.

Other aspects of the present invention may be directed to a system including a mixer or apparatus such as described above. In one implementation, such a system may include a transceiver and a power amplifier. The transceiver may perform methods in accordance with an embodiment of the present invention and may further include a mixer having the different control schemes described above. The transceiver may operate in connection with a baseband processor from which it may receive baseband data that it upconverts to a radio frequency via the mixer.

DETAILED DESCRIPTION

A digital variable gain mixer in accordance with an embodiment of the present invention may be used in various transmit sides of transceivers for multi-band wireless communications. For example, a mixer in accordance with an embodiment may be used in a GSM system to provide support for various communication protocols including GPRS and EDGE communication schemes. Accordingly, the mixer may support both GMSK and 8-PSK modulation schemes.

In an 8-PSK mode of operation, the mixer operates to upconvert incoming baseband signals (e.g., complex in-phase and quadrature-phase (I/Q) signals) to a desired transmit frequency. Furthermore, in the 8-PSK mode of operation, the mixer may provide for controlling output power levels over a significant dynamic range. The mixer may be digitally controlled to enable stepping of this dynamic range at very fine increments. For example, in one embodiment an output power control may provide for approximately 42 dB of dynamic range at step increments of 0.5 dB.

The mixer may further operate in a GMSK mode in which the mixer substantially acts as a buffer for modulated signals received from a local oscillator (LO), which may be associated with an offset PLL, in some embodiments. In this mode of operation, the mixer may provide a fixed output power level corresponding to a desired saturation level for the GMSK mode of operation.

As will be discussed further below, to effect these different modes of operation, the mixer can be controlled differently depending on the mode of operation. In the 8-PSK mode, incoming baseband I and Q signals from a baseband path to a mixer carry signal modulation and a signal received at the mixer from a LO path is an unmodulated pure carrier signal. In contrast, in the GMSK mode of operation, at least portions of the mixer may be powered down and a single incoming current from the baseband path may act as a DC current, with an incoming signal from the LO path providing the signal modulation.

While a variable gain digital mixer in accordance with an embodiment of the present invention can be implemented in many different fashions, the mixer may be adapted in a single integrated circuit (IC) transceiver that includes both receive and transmit paths and various control circuitry therefor, in one embodiment.

Figure 1:
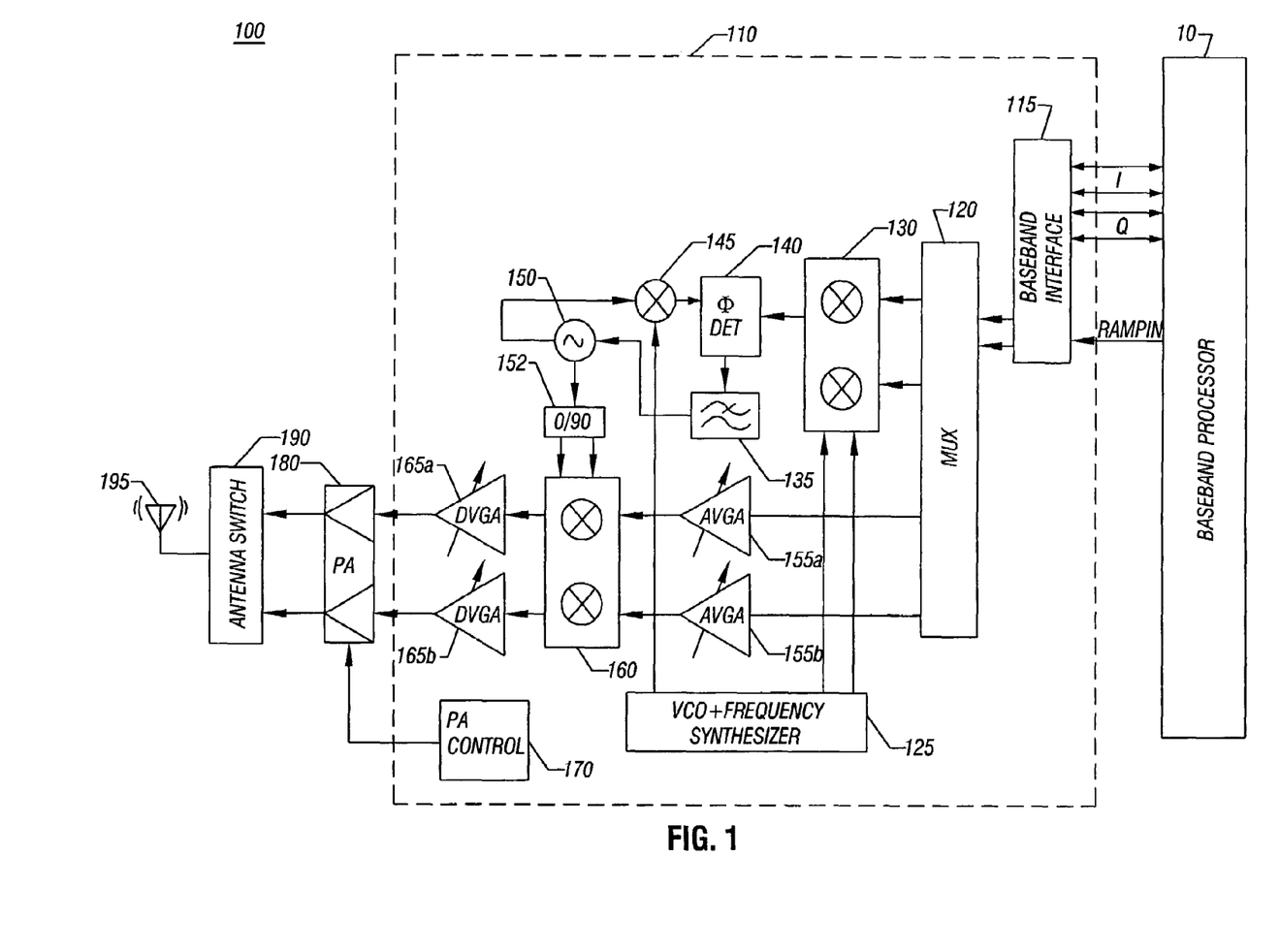
FIG. 1 is a block diagram of a transceiver including a mixer in accordance with an embodiment of the present invention.

Referring now to FIG. 1, shown is a block diagram of a transceiver including a mixer in accordance with an embodiment of the present invention. As shown in FIG. 1, a transceiver 110 may be implemented in a system 100 such as a wireless device, e.g., a cellular telephone, personal digital assistant (PDA) or other such device. Transceiver 110 may include both receive and transmit circuitry, although the transmit circuitry only is shown in the embodiment of FIG. 1 for ease of illustration. As shown in FIG. 1, transceiver 110 is coupled to a baseband processor 10. Accordingly, baseband communication may occur between transceiver 110 and baseband processor 10. On the transmit side, transceiver 110 is further coupled to a power amplifier (PA) 180, which in turn is coupled to an antenna switch 190 that itself is coupled to an antenna 195.

Still referring to FIG. 1, transceiver 110 includes various circuitry to enable receipt of baseband signals from baseband processor 10 and processing thereof to provide RF outputs to PA 180. Accordingly, transceiver 110 includes a baseband interface 115 to provide coupling to baseband processor 10. Baseband interface 115 in turn is coupled to a multiplexer 120, which is controlled to provide outputs to different paths depending on the mode of operation (e.g., GMSK mode or 8-PSK mode). In GMSK mode, I and Q data is provided to a mixer 130 which may be an intermediate frequency (IF) mixer running at a frequency of approximately 500 MHz, which is controlled to mix the signals with a frequency provided by a combined voltage controlled oscillator (VCO) and frequency synthesizer 125. The upconverted signals may be fed to an offset PLL which may be formed of various components. As shown in FIG. 1, the offset PLL may include a phase detector 140, the output of which is coupled to a filter 135. The filtered output is fed to a local oscillator (LO) 150 that is coupled in a feedback loop with a mixer 145 that in turn is fed back to phase detector 140. In turn, LO 150 provides an output to a divider/quadrature/phase shifter 152 which provides complex signals to a mixer 160.

Mixer 160 along with digital variable gain amplifiers (DVGAs) 165a and 165b correspond to the digital variable gain mixer of the present invention. That is, while shown as separate components in the embodiment of FIG. 1, mixer 160 and DVGAs 165a and 165b may be implemented with unified circuitry, in some embodiments. In GMSK mode, modulated I/Q signals provided from LO 150 are buffered in mixer 160 and mixed with a DC baseband current (which may be a single baseband path) to provide an output signal through DVGAs 165a and 165b. In 8-PSK mode, mixer 160 receives baseband currents (which may be multiple baseband paths, i.e., P and N currents for both I and Q signal paths) which are mixed with an unmodulated pure carrier signal from LO 150. Note that transceiver 110 further includes a power amplifier controller 170 to control PA 180.

Thus the embodiment of FIG. 1 shows a dual transmitter design in which different transmit paths are provided. These different paths may be controlled differently in different modes of operation. While described with this particular implementation in the embodiment of FIG. 1, it is to be understood that the scope of the present invention is not so limited and transceivers may take different forms in other embodiments. Furthermore, it is to be understood that a variable gain digital mixer in accordance with an embodiment of the present invention may be used in other circuits such as transmitters, other transceivers and the like.

The output of mixer 160 and DVGAs 165a and 165b, particularly in 8-PSK mode, may be controlled to provide output power control of at least 40 dB and further to provide such control with a fine step, e.g., 0.5 dB per step. Further, a design of the mixer may be implemented to reduce the effects of unwanted coupling of the LO outputs, as will be discussed further below. In this way, concerns regarding output-offset suppression are reduced.

To provide output power control of 41.5 dB with a 0.5 dB/step, a total tail current provided to the mixer may vary over a factor of $10^{41.5/20}=118.8$ in increments of 1.059 (i.e., $10^{0.5/20}$ steps). As an example, let the smallest unit be 1×, then the progression for the first twelve steps (i.e., 6 dB) would correspond to that shown in the first line of Table 1, which shows the increments in tail currents to attain a power control of approximately 40 dB.

TABLE 1

| 1  | 1.059 | 1.12 | 1.188 | 1.258 | 1.33 | 1.412 | 1.496 | 1.589 | 1.678 | 1.778 | 1.883  |
|----|-------|------|-------|-------|------|-------|-------|-------|-------|-------|--------|
| 2  | 2.118 | .    | .     | .     | .    | .     | .     | .     | .     | .     | 3.776  |
| 4  | 4.23  | .    | .     | .     | .    | .     | .     | .     | .     | .     | 7.532  |
| 8  | 8.47  | .    | .     | .     | .    | .     | .     | .     | .     | .     | 15.06  |
| 16 | 16.95 | .    | .     | .     | .    | .     | .     | .     | .     | .     | 30.013 |
| 32 | 33.89 | .    | .     | .     | .    | .     | .     | .     | .     | .     | 60.25  |
| 64 | 67.79 | .    | .     | .     | .    | .     | .     | .     | .     | .     | 120.5  |

As shown in Table 1, each step provides an increment/decrement of approximately 6%. Similar progressions can be obtained for increasing increments such that for a dynamic range of 41.5 dB, 84 steps occur to reach a final value of approximately 120. Note that for simplicity, Table 1 only shows the first and twelfth values of each line after the first line. It is to be understood that the incremental changes between these values may proceed at approximately 6%.

To effect this incremental progression in a mixer, a plurality of slices may be provided. However, physical process dimensions may limit the smallest slice that can be designed. The smallest increment shown above in Table 1 is in progressing from 1.059 to 1, which corresponds to a change of 0.059. If this is normalized to 1 unit (i.e., 1/0.059), the following Table 2 is obtained:

TABLE 2

| 16.94 | 17.94 | 18.97 | . | . | . | . | . | . | . | . | 31.89  |
|-------|-------|-------|---|---|---|---|---|---|---|---|--------|
| 33.88 | .     | .     | . | . | . | . | . | . | . | . | 63.96  |
| 67.67 | .     | .     | . | . | . | . | . | . | . | . | 127.05 |
| 135.5 | .     | .     | . | . | . | . | . | . | . | . | 255.1  |
| 271   | .     | .     | . | . | . | . | . | . | . | . | 508.42 |
| 592   | .     | .     | . | . | . | . | . | . | . | . | 1020.6 |
| 1089  | .     | .     | . | . | . | . | . | . | . | . | 2041.3 |

Each increment/decrement of Table 2 similarly represents a change of approximately 6%. Note that here, the normalized range to implement a dynamic range of 41.5 dB is over 2,000. This implies that a mixer should include over 2,000 slices, and more particularly a total of 2,041 slices, based on Table 2. However, such a design would be too large in area, would complicate routing and add parasitic capacitance/load on the critical LO path (i.e., inputs to a mixer from the LO).

Hence to optimize a design in accordance with one embodiment, the power control for a mixer may be split into multiple control schemes. More specifically, at lower power levels one or more slices of a mixer may be controlled at variable current density levels to provide the desired power output at these lower gain settings. In contrast, at higher gain settings the current density levels of the slices may be fixed, and additional slices may be introduced to obtain the desired gain setting. In various embodiments, these current density levels and number of slices enabled may be digitally controlled. For example, in one embodiment a single digital control word may be provided that is used to control both current density levels as well as number of slices enabled. Of course in other embodiments, multiple control words or analog control signals may be used. In this way, a mixer design may be optimized at different gain setting based on the required SNR at these gain settings (i.e., a lower SNR is required at lower gain settings than at higher gain settings).

In one embodiment, a DVGA mixer design may include a plurality of slices, with at least a first portion of the slices being enabled and controlled with varying current densities to step the gain at a substantially constant step value by first powering on a single slice and increasing the current density of the slice from a minimum value to a maximum value. Then, two slices may be enabled and the current density of both slices can be stepped from a minimum value to a maximum value and so forth until a predetermined number of slices are enabled and reach their maximum current density level. At this point, one or more slices of a second portion of slices may be enabled and controlled according to a fixed current density to further increase the gain according to the substantially constant step value, to a maximum gain of the mixer.

Referring now to Table 3, shown is a table listing a number of slices enabled and a corresponding current density on a low order of slices (i.e., at lower gain settings).

TABLE 3

| Number of Slices | Current Density Level |
|------------------|-----------------------|
| 1                | 1 → 1.88 (in 0.5 dB steps) |
| 2                | 1 → 1.88 (in 0.5 dB steps) |
| 4                | 1 → 1.88 (in 0.5 dB steps) |
| 8                | 1 → 1.88 (in 0.5 dB steps) |

As shown in Table 3, fifteen slices of a mixer may correspond to a first portion of a mixer (e.g., a low order portion of a mixer) that is controlled by varying current density levels in each of the slices from a minimum value to a maximum value. While shown with this particular number of slices and current density levels (e.g., 12 levels per slice), it is to be understood that the scope of the present invention is not so limited and other implementations are possible.

Table 4 shows a number of slices enabled per step at a high order of slices (i.e., at higher gain settings). Each block of Table 4 corresponds to a per step increment/decrement. Specifically, Table 4 shows the number of slices enabled at a fixed current density per step increase. Thus the second portion of the mixer (e.g., a high order portion of a mixer) corresponds to a number of slices (i.e., slices 16-64) that are enabled at a fixed current density level (e.g., a maximum current density level) to step a gain of the DVGA at the substantially constant step value to a maximum level.

TABLE 4

| 16 | 17 | 18 | 19 | 20 | 21 | 23 | 24 | 25 | 27 | 29 | 30 |
|----|----|----|----|----|----|----|----|----|----|----|----|
| 32 | 34 | 36 | 38 | 40 | 43 | 45 | 48 | 51 | 54 | 57 | 60 |
| 64 |    |    |    |    |    |    |    |    |    |    |    |

Accordingly, a minimum gain of the DVGA may be set by enabling a first slice at a current density level of 1 (i.e., a minimum level), while a maximum gain of the DVGA may be set by enabling 64 slices at a current density level of 1.88 (i.e., a maximum level). Thus in this embodiment, a dynamic range of $20 \log_{10} (64*1.88) = 41.6$ dB may be obtained.

Partitioning of a mixer in accordance with an embodiment of the present invention may thus provide for: optimizing the area of the mixer; design optimization over the DVGA range based on SNR requirements; and minimal loading on a LO path coupled to the mixer.

Figure 2:
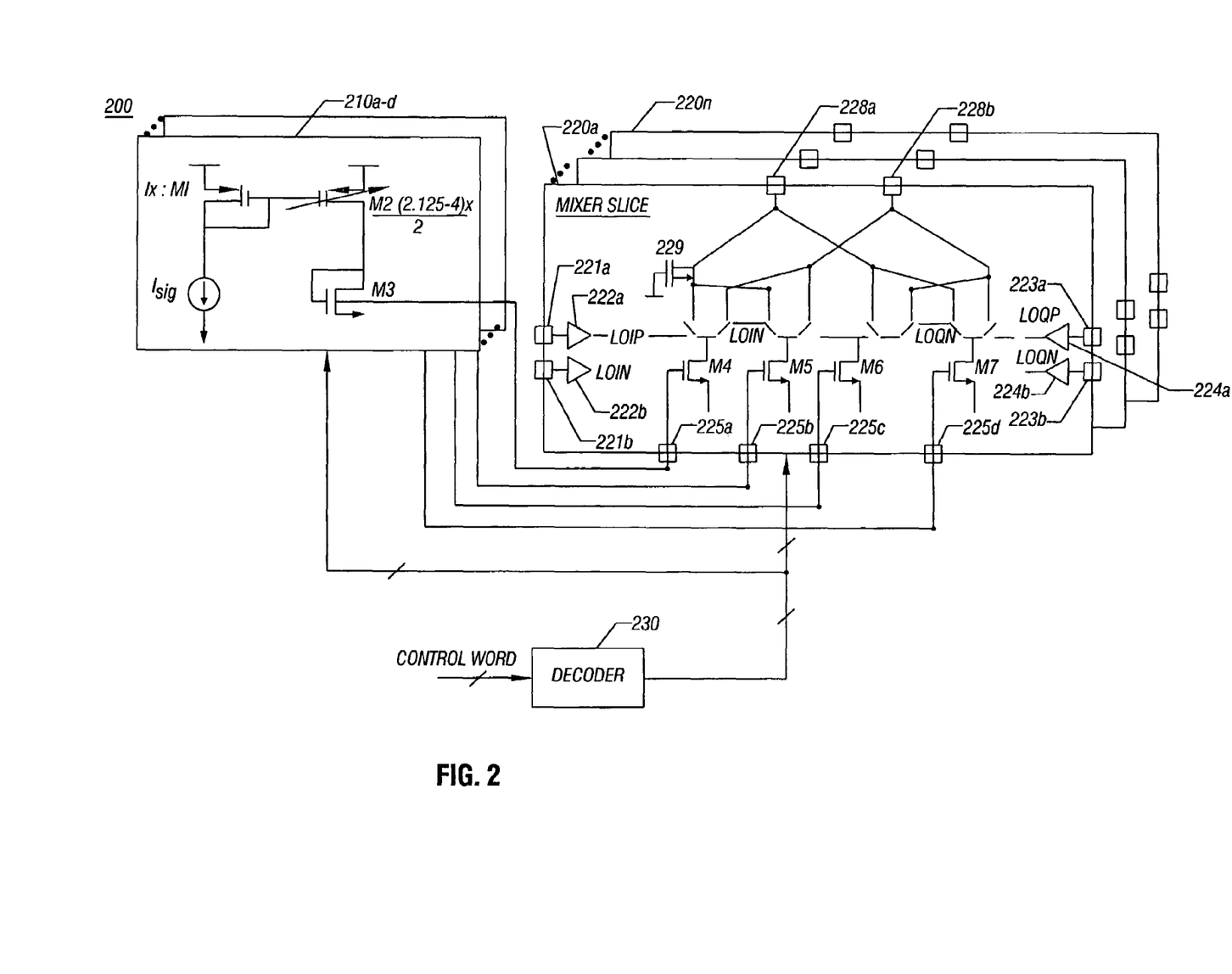
FIG. 2 is a schematic diagram of a mixer in accordance with one embodiment of the present invention.

Referring now to FIG. 2, shown is a schematic diagram of a mixer in accordance with one embodiment of the present invention. As shown in FIG. 2, mixer 200 includes a plurality of slices 220a-220n (generically slice 220). Each slice may be controlled by a set of current density controllers 210a-210d (generically current density controller 210). While a single set of corresponding controllers may be coupled to all slices, in some implementations only slices of a first portion of the mixer (i.e., a portion that is variably controlled) may have a corresponding current density controller. Slices of a second portion which are controlled according to a fixed current density level may not have an independent current density controller, in some embodiments. As further shown in FIG. 2, a decoder 230 may be coupled to receive an incoming digital control word and to decode the control word to enable both a current density level of current density controllers 210 and enable one or more of slices 220. While shown as receiving a digital control word in the embodiment of FIG. 2, it is to be understood that the scope of the present invention is not so limited.

In the embodiment of FIG. 2, each current density controller 210 may be formed of a current mirror. More specifically, as shown in FIG. 2, current density controller 210 includes a pair of MOSFETs M1 and M2, which may be p-channel MOSFETs having source terminals coupled to a supply voltage and having gate terminals tied together. MOSFET M1 further has its gate terminal coupled to its drain terminal, which in turn is coupled to an incoming baseband signal current, $I_{sig}$, e.g., from a baseband processor.

As shown in FIG. 2, MOSFETs M1 and M2 may be of different sizes, with MOSFET M2 having a controllable size (e.g., under control of digital signals from decoder 230). In the embodiment of FIG. 2, MOSFET M1 may correspond to a size of 1× (i.e., of a unit size), while MOSFET M2 may correspond to a size of (2.125–4)×/2, where the range between 2.125 and 4 may be controlled by the digital control signals. The drain terminal of MOSFET M2 is coupled to a drain terminal of another MOSFET M3 that is used to pass a signal current to a corresponding input of slice 220. Thus as shown in FIG. 2, the output of each of current density controllers 210a-210d may be coupled to a respective input 225a-225d of slice 220 to pass P and N baseband currents for both I and Q paths.

Still referring to FIG. 2, each mixer slice may be coupled to receive incoming current signals, which may either be variably-controlled signals or fixed signals from associated current density controllers 210. These signals may be input via input pins 225a-225d and may be coupled to a gate terminal of a corresponding one of MOSFETs M4-M7, which may be n-channel MOSFETs in one embodiment. These MOSFETs may thus be controlled to pass a tail current to corresponding mixer circuitry to enable mixing of the tail current with signals from a LO. More specifically, as shown in FIG. 2, each slice 220 is coupled to receive incoming LO signals, namely differential I and Q LO signals via input pins 221a and 221b and 223a and 223b. These incoming LO signals, which may either correspond to modulated I/Q signals in a GMSK mode or unmodulated carrier signals in an 8-PSK mode, may be coupled through input buffers 222a and 222b and 224a and 224b to a mixing network for mixing with the respective tail current. These mixing networks may thus mix the incoming signals and provide them to differential output pins 228a and 228b. As shown in FIG. 2, a cascoded switch 229 may be coupled between the mixing networks and output pins 228 to reduce electromagnetic interference when the slice is disabled. Note only a single switch is shown for ease of illustration in FIG. 2. However, each output path from the mixing networks may include such a switch. While shown with this particular implementation in the embodiment of FIG. 2, it is to be understood that the scope of the present invention is not so limited.

Because various embodiments of the present invention may be implemented in a linear transmit architecture, concerns may exist that an unmodulated LO carrier frequency (i.e., an LO tone) can leak from the LO path into the RF output of the mixer, particularly in an 8-PSK mode. Thus even at the lowest power levels a difference between leakage from the LO path and the RF signals should be at least −40 dB.

Various control mechanisms and layout principles may be used to reduce such LO leakage. For example, LO inputs into a mixer may be prevented from being coupled into an RF output signal by reducing parasitics in the mixer and disabling slices of the mixer that are not used for a given power output level. Furthermore, the layout of the DVGA mixer may address LO leakage by taking into account transmit loops carrying unmodulated carrier currents and their interaction with output loops. This interaction is primarily electromagnetic in nature. Electrical coupling of the LO path to the transmit output can be controlled by applying design techniques of cascoding and symmetrical layout within the slice. As discussed above, in some implementations the slices may include cascode switches to disable paths through slices that are not enabled for a given power output level. Furthermore, as will be described with reference to FIG. 3 below, a mixer layout may be implemented to prevent or reduce transmit loops (i.e., incoming from an LO path) from coupling onto receive loops (i.e., outgoing from the mixer). A symmetrical or at least substantially symmetrical layout of the mixer may be performed by identifying transmit and receive loops and laying these loops out accordingly so that interference from the transmit/receive loops cancel each other out.

Figure 3:
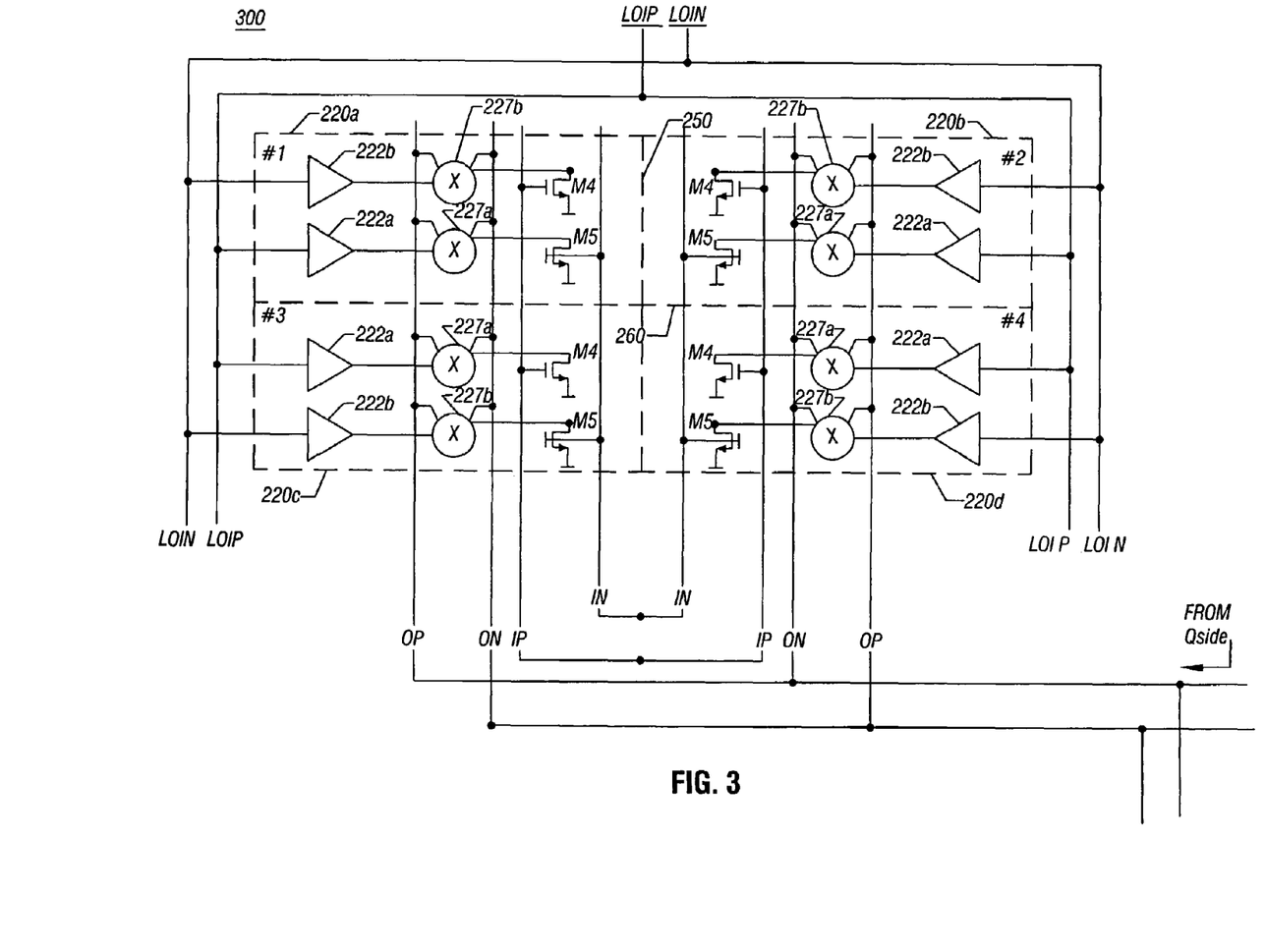
FIG. 3 is a block diagram of a layout of a mixer in accordance with one embodiment of the present invention.

Referring now to FIG. 3, shown is a block diagram of a layout of a mixer in accordance with one embodiment of the present invention. As shown in FIG. 3, a partial layout 300 of four mixer slices is shown for purposes of illustration. However, it is to be understood that the scope of the present invention is not so limited and many more such mixer slices may be present in other embodiments. For example, in one particular implementation, 64 mixer slices may be present. As shown in FIG. 3, mixer slices 220a-220d each include the in-phase (I) portions of these mixer slices. While not shown in FIG. 3, it is to be understood that the Q-phase portions of the mixers may be formed as a mirror image of layout 300. That is, the Q-phase can be at least substantially symmetric with respect an axis between the I-phase and the Q-phase.

Discussion of a particular slice 220a will be set forth, and it is to be understood that slices 220b-220d are similarly laid out, although each slice is mirrored along a given axis. Thus, slice 220b is a mirror image of slice 220a with respect to a first axis 250, while slice 220c is also mirror imaged from slice 220a with respect to a second axis 260, and slice 220d is a mirror image of slice 220c with respect to first axis 250. As shown in FIG. 3, slice 220a is coupled to receive incoming in-phase positive and negative currents from a local oscillator path (i.e., LO IP and LO IN). A first buffer 222b is coupled to receive the negative current, while a second buffer 222a is coupled to receive the positive current. The outputs of these buffers are coupled to respective mixer circuits 227b and 227a, which are also coupled to receive tail currents passed by MOSFETs M4 and M5. As shown, MOSFETs M4 and M5 have gate terminals coupled to incoming differential baseband currents IP and IN, respectively. In turn, MOSFETs M4 and M5 have drain terminals coupled to mixer circuits 227b and 227a, respectively. The outputs of mixer circuits 227b and 227a are coupled to differential output lines OP and ON, respectively. Accordingly, a differential RF output signal (formed of ON and OP) is obtained from all individual mixer slices that are short circuited together along with similar mixer outputs from a Q-side portion of a layout to generate RF output signals that are passed, e.g., via output pins of the mixer and out of a transceiver and into a power amplifier, for example. Note that slice 220a is simplified for purposes of discussion, and it is to be understood that additional components such as cascode switches and control/enable/disable mechanisms may also be present in the slices.

Similar layouts to that described for mixer 220a, with appropriate mirror imaging and/or reflections are present in mixers 220b-220d. Furthermore, additional mixer slices may also be present in a given design and may be similarly laid out to the four slices shown in layout 300.

In operation, layout 300 may inherently cancel flux caused by the various transmission loops. Accordingly, incoming LO energy that is input into layout 300 (e.g., LO IP) induces energy in the mixers of the left side of layout 300 that is substantially cancelled out by the layout of the mixers of the right side of layout 300. Similarly, a transmission loop in the opposite direction caused by LO energy via the LO IN current similarly induces energy in the mixers of the right hand side of layout 300 that is substantially cancelled by the mixers of the left hand side of layout 300. Note that a Q-side of a mixer may be laid out identically with mirror symmetry. In this way, good electromagnetic isolation may exist for the segmented structure of a mixer in accordance with one embodiment. While described with this particular layout in the embodiment of FIG. 3, it is to be understood that the scope of the present invention is not so limited, and in other embodiments other layouts which symmetrically provide for multiple slice paths laid out to substantially cancel induced energy caused by various transmission loops from an undesired interference source (e.g., unmodulated LO signals) can be effected.

Figure 4:
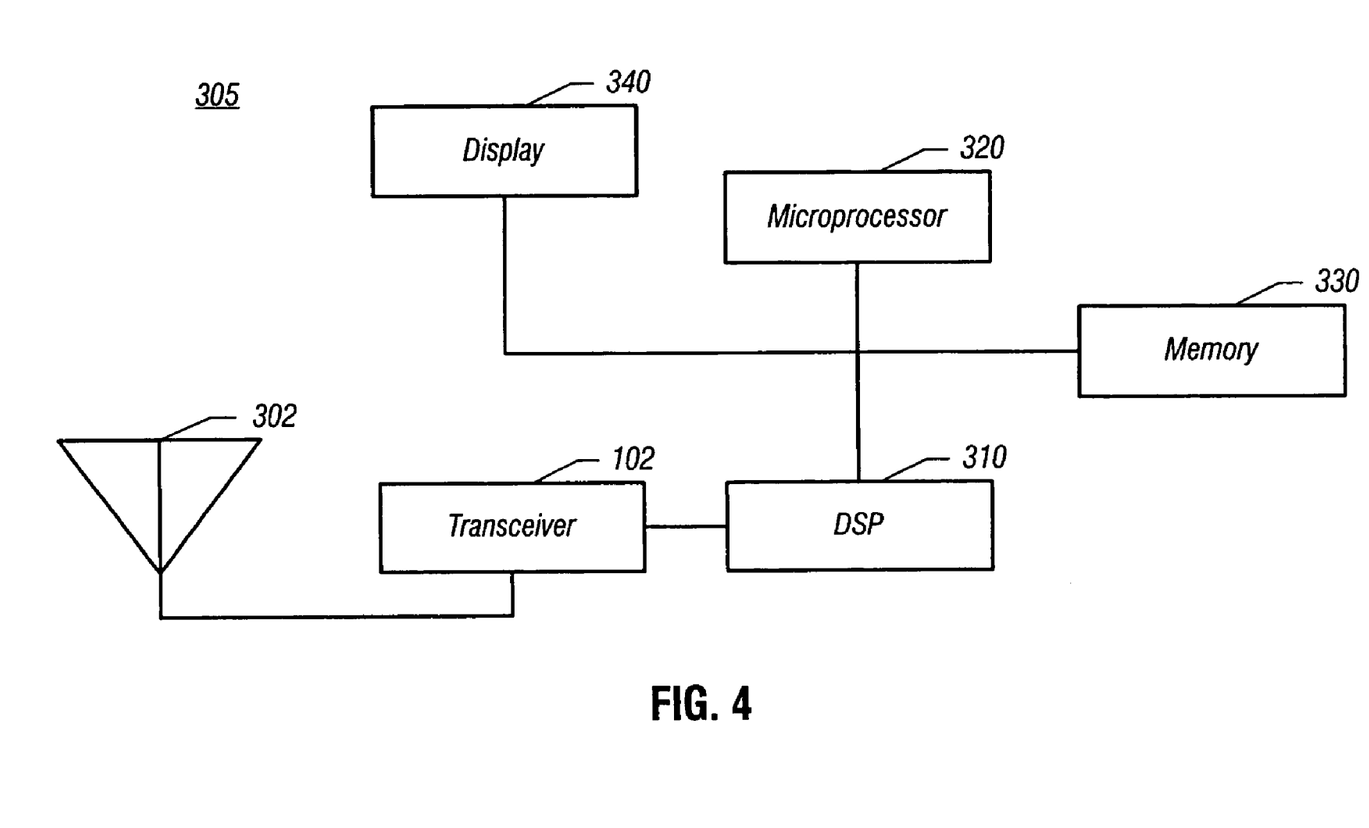
FIG. 4 is a block diagram of a system in accordance with one embodiment of the present invention.

A mixer in accordance with an embodiment of the present invention can be implemented in many different systems. As one example, referring now to FIG. 4, shown is a block diagram of a system. As shown in FIG. 4, system 305 may be a cellular telephone handset, although the scope of the present invention is not so limited. For example, in other embodiments, the system may be a pager, personal digital assistant (PDA) or other such device. As shown, an antenna 302 may be coupled to a transceiver 102, such as transceiver 110 of FIG. 1. In turn, transceiver 102 may be coupled to a digital signal processor (DSP) 310, which may handle processing of baseband communication signals. In turn, DSP 310 may be coupled to a microprocessor 320, such as a central processing unit (CPU) that may be used to control operation of system 305 and further handle processing of application programs, such as personal information management (PIM) programs, email programs, downloaded games, and the like. Microprocessor 320 and DSP 310 may also be coupled to a memory 330. Memory 330 may include different memory components, such as a flash memory and a read only memory (ROM), although the scope of the present invention is not so limited. Furthermore, as shown in FIG. 4, a display 340 may be present to provide display of information associated with telephone calls and application programs. Although the description makes reference to specific components of system 305, it is contemplated that numerous modifications and variations of the described and illustrated embodiments may be possible. Furthermore, transceiver 102 and/or DSP 310 may include an article in the form of a machine-readable storage medium (or may be coupled to such an article, e.g., memory 330) onto which there are stored instructions and data that form a software program. The software program may provide for control a mixer of transceiver 102, e.g., for controlling a gain of the mixer by enabling/disabling different slices and/or controlling a current density level of tail currents provided to the mixer.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
controlling a gain of a mixer to provide a range of selected power output levels from the mixer using a first control scheme for a low portion of the range and using a second control scheme for a high portion of the range; and
upconverting incoming baseband signals in the mixer to a transmission frequency and outputting transmission signals from the mixer at the selected power output level, wherein the first control scheme comprises controlling a current density of the incoming baseband signals coupled to one or more mixer slices, and the second control scheme comprises coupling the incoming baseband signals to additional mixer slices at a fixed current density.

2. The method of claim 1, wherein using the first control scheme comprises:
digitally controlling a current density of the incoming baseband signals; and
coupling the controlled incoming baseband signals to at least one of a plurality of mixer slices for mixing with a local oscillator signal.

3. The method of claim 2, further comprising digitally enabling the at least one of the plurality of mixer slices to receive the controlled incoming baseband signals to attain the gain at a selected power output level.

4. The method of claim 1, wherein the second control scheme comprises digitally enabling a selected number of a plurality of mixer slices to receive the incoming baseband signals at a fixed current density level.

5. An apparatus comprising:
a current density controller to receive an incoming baseband signal and to adjust a current density level of the incoming baseband signal under digital control;
a mixer coupled to the current density controller, the mixer including a plurality of slices each capable of receiving the incoming baseband signal at the current density level when enabled, wherein the plurality of slices are individually enabled under the digital control; and a decoder coupled to receive control information and provide the digital control to the current density controller and the mixer.

6. The apparatus of claim 5, wherein the current density controller comprises a current mirror having a controllable gain to generate a tail current from the incoming baseband signal, the tail current having an adjustable current density level based on the controllable gain.

7. The apparatus of claim 6, wherein each of the plurality of slices includes enable circuitry to disable the slice under the digital control.

8. The apparatus of claim 7, wherein each of the plurality of slices includes a plurality of buffers coupled to receive a local oscillator output, a mixer circuit to modulate the local oscillator output with the tail current, and at least one cascode switch coupled between an output of the mixer circuit and an output of the slice, the cascode switch to disable a path to the output of the slice when the slice is disabled and provide isolation from a transmit output.

9. The apparatus of claim 5, wherein the mixer is to output a radio frequency (RF) signal at a selected power level, wherein the current density controller is to adjust the current density level if the selected power level is in a first range.

10. The apparatus of claim 9, wherein the decoder is to enable at least one of the plurality of slices to receive the incoming baseband signal at a fixed current density level if the selected power level is in a second range, the second range greater than the first range.

11. The apparatus of claim 5, wherein the mixer is to receive an unmodulated carrier signal from a local oscillator and to mix the unmodulated carrier signal with the incoming baseband signal in a first mode of operation, the incoming baseband signal being modulated.

12. The apparatus of claim 11, wherein the mixer is to receive and buffer a modulated signal from the local oscillator and to mix the modulated signal with a DC current in a second mode of operation.

13. The apparatus of claim 5, wherein the current density controller is to vary the current density level in a low range of power output levels and to fix the current density level at a maximum value in a high range of power output levels.

14. A mixer comprising:

a first slice having a first pair of buffers to receive local oscillator (LO) signals of different polarities, a first pair of switches to receive and pass tail currents of different polarities, and a first mixer circuit to mix the LO signals with the tail currents; and a second slice having a second pair of buffers to receive the LO signals, a second pair of switches to receive and pass the tail currents, and a second mixer circuit to mix the LO signals with the tail currents, wherein the second slice comprises a mirror image of the first slice with respect to a first axis.

15. The mixer of claim 14, further comprising a third slice having a third pair of buffers to receive the LO signals, a third pair of switches to receive and pass the tail currents, and a third mixer circuit to mix the LO signals with the tail currents, wherein the third slice comprises a mirror image of the first slice with respect to a second axis.

16. The mixer of claim 14, wherein the first slice and the second slice comprise an in-phase portion of individual slices of the mixer and a quadrature-phase portion of the individual slices, wherein the quadrature-phase portion is substantially symmetric to the in-phase portion with respect to an axis.

17. The mixer of claim 14, wherein the second slice is to cancel a flux created in the first slice by an incoming LO signal of a first polarity and the first slice is to cancel a flux created in the second slice by an incoming LO signal of a second polarity.

18. The mixer of claim 14, wherein the first slice is to receive the tail currents corresponding to modulated baseband signals to mix with unmodulated LO signals in an 8-PSK mode.

19. The mixer of claim 18, wherein the first slice is to receive the tail currents corresponding to a DC current to mix with modulated LO signals in a GMSK mode.

20. The mixer of claim 14, wherein the first pair of switches and the second pair of switches are proximally located with respect to the first axis and the first pair of buffers and the second pair of buffers are distally located with respect to the first axis.

21. The mixer of claim 20, wherein the first mixer circuit is located between the first pair of switches and the first pair of buffers with respect to the first axis.

22. A system comprising:

a transceiver having an interface to receive a plurality of inputs including baseband data from a processor, the transceiver including a mixer to mix the baseband data with a radio frequency (RF) signal to provide a plurality of RF outputs, wherein the mixer is digitally controlled to provide the plurality of RF outputs with a variable gain;

a power amplifier coupled to the transceiver to receive the plurality of RF outputs;

an antenna switch to receive the plurality of RF outputs; and an antenna coupled to an antenna switch and the power amplifier to transmit and receive information;

wherein the transceiver further comprises a current density controller to vary a current density level of the baseband data in a low range of the variable gain and to fix the current density level at a maximum value in a high range of the variable gain.

23. The system of claim 22, wherein the transceiver further comprises a decoder to enable at least one of a first plurality of slices of the mixer to receive baseband data at a variable current density level if the variable gain is in a first range and to enable at least one of a second plurality of slices to receive the baseband data at a fixed current density level if the variable gain is in a second range, the second range greater than the first range.

24. The system of claim 22, wherein the mixer includes a first plurality of slices having input components and mixer components arranged according to a first layout and a second plurality of slices having input components and mixer components arranged according to a second layout, the second layout comprising a mirror image of the first layout, wherein the first plurality of slices cancel a flux created in the second plurality of slices by an incoming local oscillator signal of a first polarity and the second plurality of slices cancel a flux created in the first plurality of slices by an incoming local oscillator signal of a second polarity.

* * * * *